United States Patent [19]

Shibuya et al.

[11] Patent Number: 4,863,997

[45] Date of Patent: Sep. 5, 1989

[54] POLYPHENYLENE ETHER COMPOSITION

[75] Inventors: Nobuhiro Shibuya; Hideyuki Takahashi, both of Mie; Takeyoshi Nishio, Aichi, all of Japan

[73] Assignees: Mitsubishi Petrochemical Co, Ltd., Tokyo; Toyota Jidosha Kabushiki Kiasha, Toyota, both of Japan

[21] Appl. No.: 105,281

[22] Filed: Oct. 7, 1987

[30] Foreign Application Priority Data

Oct. 7, 1986 [JP] Japan .................. 61-238839
Oct. 31, 1986 [JP] Japan .................. 61-258396

[51] Int. Cl.$^4$ ............................................. C08L 71/04
[52] U.S. Cl. ...................................... 525/92; 524/186; 524/502; 524/505; 525/68; 525/905
[58] Field of Search ............................. 525/92, 905, 68

[56] References Cited

FOREIGN PATENT DOCUMENTS

| | | |
|---|---|---|
| 0115218 | 8/1984 | European Pat. Off. . |
| 0133487 | 2/1985 | European Pat. Off. . |
| 0135726 | 4/1985 | European Pat. Off. . |
| 0142166 | 5/1985 | European Pat. Off. . |

*Primary Examiner*—Jacob Ziegler
*Attorney, Agent, or Firm*—Oblon, Spivak, McClelland, Maier & Neustadt

[57] ABSTRACT

A polyphenylene ether composition comprising (a) a polyolefin resin, (b) a polyphenylene ether resin, and (c) a hydrogenated block copolymer of an alkenyl aromatic compound and a conjugated diene which contains more than 45% by weight and up to 80% by weight of a repeating unit derived from the alkenyl aromatic compound. The composition has a high flexural modulus and excellent mechanical properties, such as impact resistance.

14 Claims, No Drawings

POLYPHENYLENE ETHER COMPOSITION

FIELD OF THE INVENTION

This invention relates to a resin composition having an excellent balance of mechanical properties centering in stiffness and exhibiting satisfactory molding properties, oil resistance, and chemical resistance. More particularly, it relates to a polyphenylene ether composition for injection molding, extrusion molding or blow molding comprising a polyolefin, preferably a crystalline polyolefin, a polyphenylene ether resin, and a partially hydrogenated alkenyl aromatic compound/conjugated diene block copolymer having a specific composition, which has excellent balance of mechanical properties, such as stiffness, impact strength, and heat resistance, as well as satisfactory molding properties, organic solvent resistance, and chemical resistance.

BACKGROUND OF THE INVENTION

Polyolefins have conventionally been used in a wide application as various molded articles, sheets, etc. because of their excellent molding properties, toughness, water resistance, organic solvent resistance, and chemical resistance, low specific viscosity, and inexpensiveness. However, the polyolefins are insufficient in heat resistance, leaving room for improvement, which has given rise to a bar to broadening of application.

On the other hand, polyphenylene ether resins are excellent in heat resistance but unsatisfactory in molding properties and solvent resistance, thus finding limited applications to be made of them. In order to improve molding properties, impact strength, and the like, polyblends of polyphenylene ether resins with, for example, styrene resins have been employed. However, the range of their application is still limited to poor solvent resistance. For example, these polyblends are unsuitable in the field requiring resistance to oils, such as gasoline.

A number of blend compositions of polyolefins and polyphenylene ethers have been proposed aiming at compensation for the respective disadvantages while retaining the respective advantages inherently possessed. For instance, the composition disclosed in Japanese Patent Publication No. 7069/67 has been developed for the purpose of improving molding properties and tensile properties. However, it does not always attain the relatively high level of mechanical strength demanded in industry. Further, for the purpose of improving compatibility between polyolefins and polyphenylene ether resins to thereby enhance mechanical strength, there have been proposed compositions having incorporated therein a styrene/butadiene block copolymer or a hydrogenated product thereof as disclosed in Japanese Laid-Open patent application Nos. 71158/78, 88960/79, and 100159/84 and compositions comprising these components and, in addition, inorganic fillers as disclosed in Japanese Laid-Open patent application No. 103556/83. Although these compositions show improvements in molding properties and mechanical strength, they fail to take full advantage of organic solvent resistance inherent to polyolefins from the reason that the compounding ratio of the polyolefin is small or the matrix (continuous phase) consists of the polyphenylene ether resin or a combination of the polyphenylene ether resin and a styrene resin. It has also been proposed to blend a polyphenylene ether resin with a large amount exceeding 20% by weight of polyolefin and further add, as a compatibilizer, a diblock copolymer or a radial teleblock copolymer comprising an alkenyl aromatic compound and a conjugated diene or a hydrogenated product thereof as disclosed in Japanese Laid-Open patent application Nos. 103557/83 and 76547/85. These publications state that compatibility between a polyphenylene ether resin and low-density polyethylene as polyolefin can be improved by compounding a hydrogenated diblock copolymer of an alkenyl aromatic compound and a conjugated diene thereby bringing about improvements on tensile properties, brittleness, and the like. However, only the improvement in compatibility is not enough to satisfy various performance requirements generally demanded for resins. More specifically, the composition of three-component system disclosed in Japanese Laid-Open application No. 76547/85 which comprises polyphenylene ether, a large proportion of low-density polyethylene as polyolefin, and, as a compatibilizer, a hydrogenated diblock copolymer of an alkenyl aromatic compound and a conjugated diene has limitations on its use due to seriously inferior stiffness. The resin composition of the same system using polypropylene as a polyolefin achieves some improvement on stiffness and heat resistance, but there is still room for further improvements for practical use.

SUMMARY OF THE INVENTION

One object of this invention is to add further improvements to the above-described conventional resin compositions and to provide a resin composition which exhibits well-balanced mechanical strength properties, solvent resistance, and molding properties on relatively high levels as required in various applications, such as industrial parts.

The inventors have extended their researches into polyphenylene ether resins, polyolefins, and various compounding agents. As a result, it has now been found that a resin composition exhibiting well-balanced mechanical properties chiefly including stiffness, satisfactory solvent resistance, and satisfactory molding properties can be obtained by compounding a hydrogenated block copolymer of an alkenyl aromatic compound and a conjugated diene having properties of specific ranges with a combination of a polyphenylene ether resin and a crystalline polyolefin.

The composition according to this invention essentially comprises (a) from 20 to 80% by weight of a polyolefin resin, (b) from 20 to 80% by weight of a polyphenylene ether resin, and (c) from 4 to 50% by weight of a hydrogenated block copolymer of an alkenyl aromatic compound and a conjugated diene which contains more than 45% by weight and up to 80% by weight of a repeating unit derived from the alkenyl aromatic compound.

The resin composition of this invention has well-balanced mechanical strength properties chiefly including stiffness and heat resistance on higher levels as well as satisfactory solvent resistance and satisfactory molding properties compared with the conventional compositions comprising a polyolefin resin and a polyphenylene ether resin.

DETAILED DESCRIPTION OF THE INVENTION

The polyolefin resins which can be used in the present invention include homopolymers of an α-olefin having a straight or branched chain or alicyclic structure such as ethylene, propylene, butene-1, pentene-1, hexene-1, 3-methylbutene-1, 4-methylpentene-1, heptene-1, octene-1, vinylcyclohexane, vinylcyclopentane, etc.; random, block, graft or other copolymers of two or more comonomers selected from among these α-olefins; random, block, graft or other copolymers comprising at least one of the above-described α-olefins as a major component and at least one of other unsaturated comonomers; and oxidation, halogenation or sulfonation products of these polymers. These polyolefin resins show crystallinity at least partly.

Examples of the aforesaid unsaturated comonomers include unsaturated organic acids or derivatives thereof, e.g., acrylic acid, methacrylic acid, maleic acid, itaconic acid, methyl acrylate, ethyl acrylate, methyl methacrylate, maleic anhydride, an arylmaleinimide, an alkylmaleinimide, etc.; vinyl esters, e.g., vinyl acetate, vinyl butyrate, etc.; aromatic vinyl compounds, e.g., styrene, methylstyrene, etc.; vinylsilanes, e.g., vinyltrimethylmethoxysilane, γ-methacryloyloxypropyltrimethoxysilane, etc.; and non-conjugated dienes, e.g., dicyclopentadiene, 4-ethylidene-2-norbornene, 4-methyl-1,4-hexadiene, 5-methyl-1,4-hexadiene, etc.

The above-enumerated polyolefins can be prepared by polymerization or modification according to known processes. Any of commercially available polyolefin resins may be utilized. These polyolefins may be used either individually or in combinations thereof.

Preferred among them are homopolymers of ethylene, propylene, butene-1, 3-methylbutene-1 or 4-methylpentene-1 and copolymers comprising at least one of these α-olefins as a major component. More preferred are combinations of a homo- or copolymer of one or more of the α-olefins and a copolymer of a different kind of an α-olefin or a different copolymerization ratio.

The polyolefin resins may be obtained from those having lower molecular weight or higher molecular weight by inducing a molecular weight change through a known manner, for example, heat treatment in the presence or absence of a radical generator (e.g., organic or inorganic peroxides, organic tin compounds, organic azo compounds, etc.), heating or mechanical shearing during melt-kneading, or the like technique.

Among the above-described polyolefin resins, propylene-based polymers having crystallinity attributed to an isotactic polypropylene chain (hereinafter referred to as polypropylene resin) are preferred.

The polypropylene resin which can be used preferably in the present invention includes a propylene homopolymer, a copolymer comprising propylene as a major component and other α-olefin monomer(s), and mixtures of such homo- or copolymer and α-olefin polymer showing rubbery properties at ambient temperature.

α-Olefins copolymerizable with propylene include vinyl-terminated compounds having a straight or branched chain or alicyclic structure in the molecule thereof, e.g., ethylene, butene-1, pentene-1, hexene-1, 3-methylbutene-1, 4-methylpentene-1, heptene-1, octene-1, vinylcylohexane, vinylcyclopentane, etc. From the standpoint of cost, availability, and ease of copolymerization, ethylene and butene-1 are preferred, with ethylene being more preferred.

Crystallinity attributed to isotactic polypropylene chain can be confirmed by determination of behaviors in melting and crystallization by means of a differential scanning calorimeter or determination of viscoelastic behavior with temperature change by means of a mechanical spectrometer, etc. In view of ensuring higher stiffness of the resin composition, it is desirable that the polypropylene resin has higher tacticity and a higher melting point.

The aforesaid α-olefin polymer having rubbery properties at ambient temperature includes an ethylene/propylene rubber (EPR), an ethylene/butene-1 copolymer rubber (EBR), and an ethylene-propylene-butene-1 copolymer rubber (EPBR). In addition, so-called EPDM containing a small amount of a non-conjugated diene as a comonomer can also be used. Preferred of these are EPR, EBR, and EPBR, with EPR being more preferred.

The mixture of a propylene homopolymer or a propylene-based copolymer with the above-described α-olefin polymer having rubbery properties at ambient temperature can ∘be otained by (i) polymerizing the latter α-olefin polymer either before or after homo- or copolymerization of propylene through at least one step, (ii) separately preparing the homo- or copolymer of propylene and the α-olefin polymer and mixing them in a molten state or dissolved state, or (iii) mixing and kneading the α-olefin polymer at the time when the propylene homo- or copolymer is mixed with the components (b) and (c).

These polypropylene resin may further contain a minor proportion of a non-conjugated diene compound, e.g., 4-methyl-1,4-hexadiene, 5-methyl-1,4-hexadiene dicylopentadiene, 4-ethylidene-2-norbornene, etc. as a comonomer or a minor proportion of polyethylene.

From the standpoint of availability and balance between cost and physical properties, preferred among these polypropylene resins are propylene/ethylene block copolymers, mixtures of a propylene/ethylene block copolymer and EPR, mixtures of a propylene homopolymer and EPR, with the propylene/ethylene block copolymers being more preferred.

The recommended proportion of the α-olefin other than propylene in the polypropylene resin is at least 1% by weight from the standpoint of attaining high impact strength and up to 30% by weight from the standpoint of taking advantage of characteristics possessed by polypropylene. It preferably ranges from 3 to 25% by weight, more preferably from 5 to 25% by weight, and most preferably from 5 to 16% by weight. The copolymerization ratio of the α-olefin other than propylene can be determined by general NMR analysis or infrared spectroscopic analysis.

The content of a cold xylene-soluble matter (hereinafter referred to as CXS) in the polypropylene resin is suitably at least 3% by weight from the standpoint of attaining high impact strength and up to 40% by weight from the standpoint of obtaining high stiffness. The CXS content preferably ranges from 8 to 30% by weight, more preferably from 11 to 25% by weight, and most preferably from 13 to 22% by weight.

CXS content determination can be carried out by, for example, dipping a sample weighing 2 g in 300 ml of boiling xylene for 20 minutes to dissolve, followed by cooling to room temperature, collecting the precipitated solid by filtration by means of a G4 type glass filter, and calculating back to the CXS content from the dry solid content.

The properties of the CXS in the polypropylene resin are characterized by various factors specifying a molecular structure, such as copolymerization ratio of propylene and other α-olefins, molecular weight, molecular weight distribution, randomness index, etc. While any of CXS having various properties may be used, the copolymerization ratio of the α-olefin other than propylene preferably ranges from 10 to 90% by weight, and more preferably from 30 to 70% by weight, and the intrinsic viscosity, a measure of molecular weight of CXS, usually ranges from 0.2 to 7 dl/g, preferably from 0.5 to 5 dl/g, more preferably from 0.5 to 4 dl/g, most preferably from 1 to 4 dl/g, and particularly preferably from 2 to 4 dl/g, as measured in ortho-dichlorobenzene at 140° C.

The above-described polypropylene resin preferably has an MFR (230° C., load of 2.16 kg) in the range of from 0.01 to 400, more preferably from 0.15 to 60, and most preferably from 0.5 to 40. the polypropylene resin having an MFR of less than 0.01 tends to find difficulty in molding, and that having an MFR of more than 400 exhibits unfavorably low mechanical strength.

As previously described with respect to polyolefins, the polypropylene resins having an MFR within the above-recited range may be prepared from those having a lower MFR (i.e., higher molecular weight) by inducing a molecular weight change through a known manner, for example, heat treatment in the presence or absence of a radical generator (e.g., organic or inorganic peroxides, organic tin compounds, organic azo compounds, etc.), heating or mechanical shearing during melt-kneading, or the like technique.

The above-described polypropylene resins can be produced by various known processes. Commercially available polypropylene resins may also be employed.

The polyphenylene ether resin (b) which can be used in the present invention has a repeating structural unit represented by formula:

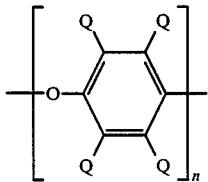

wherein Q represents a monovalent substituent selected from hydrogen atom, a halogen atom, a hydrocarbon group containing nor tertiary α-carbon atom, a halogenated hydrocarbon group containing at least two carbon atoms between a halogen atom and a phenyl nucleus, a hydrocarbon oxy group, and a halogenated hydrocarbon oxy group containing at least two carbon atoms between a halogen atom and a phenyl nucleus; and n represents an integer of 30 or more. The ether oxygen atom per unit is connected to the benzene nucleus of the next unit.

Typical examples of the polyphenylene ether are poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dipropenyl-1,4-phenylene)ether, poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly2,5-dibromo-1,4-phenylene)ether, and analogues thereof.

Copolymers, such as a 2,6-dimethylphenol/2,3,6-trimethylphenol copolymer, a 2,6-dimethylphenol/2,3,5,6-tetramethylphenol copolymer, and a 2,6-diethylphenol/2,3,6-trimethylphenol copolymer, can also be used.

The polyphenylene ether resin to be used additionally includes modified polyphenylene ethers obtained by grafting a styrene monomer (e.g., styrene, p-methylstyrene, α-methylstyrene, etc.) to the polyphenylene ether having a repeating unit of the above formula.

Processes for producing these polyphenylene ether resins are known as described, e.g., in U.S. Pat. Nos. 3,306,874, 3,306,875, 3,257,357, and 3,257,358, Japanese Patent Publication No. 17880/77, and Japanese Laid-Open patent application No. 51197/75.

The polyphenylene ether resins which are preferred in the present invention include those having an alkyl group at each of the two ortho-positions with respect to the ether oxygen atom and 2,6-dialkylphenol/2,3,6-trialkylphenol copolymers. Among them, more preferred are polymers of 2,6-dimethylphenol.

The intrinsic viscosity of the polyphenylene ether as measured in chloroform at 30° C., indicative of molecular weight, preferably ranges from 0.2 to 0.7 dl/g, more preferably from 0.3 to 0.6 dl/g, most preferably from 0.35 to 0.55 dl/g, and particularly preferably from 0.38 to 0.52 dl/g. If it is less than 0.2 dl/g, the resulting resin composition is inferior in mechanical strength. If it is more than 0.7 dl/g, molding properties of the composition is deteriorated.

The polyphenylene ether resin to be used may be blended with resins compatible therewith, such as polystyrene, for viscosity control.

The partially hydrogenated alkenyl aromatic compound/conjugated diene block copolymer which can be used as component (c) in the present invention is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having a branched chain.

The monomer distribution is not particularly restricted and may be either uniform or non-uniform and may be tapered so that the monomer proportion increases or decreases along the molecular chain. Therefore, the individual blocks (A) or (B) may have the same or different molecular weights. Further the block copolymer may contain a random chain derived from an alkenyl aromatic compound/conjugated diene random copolymer moiety in parts of the block structure.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula:

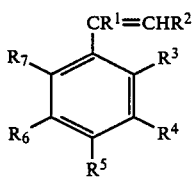

wherein $R^1$ and $R^2$ each represents a hydrogen atom, a lower alkyl group having from 1 to 6 carbon atoms or an alkenyl group having from 2 to 6 carbon atoms; $R^3$ and $R^4$ each represents a hydrogen atom, a lower alkyl group having from 1 to 6 carbon atoms, a chlorine atom or a bromine atom; and $R^5$, $R^6$, and $R^7$ each represents a hydrogen atom, a lower alkyl group having from 1 to 6 carbon atoms or an alkenyl group having from 2 to 6 carbon atoms, or $R^6$ and $R^7$ are taken together to form a naphthyl group.

Specific examples, of the alkenyl aromatic compounds include styrene, p-methylstyrene, α-methyl-styrene, vinylxylene, vinyltoluene, vinylnaphthalene, divinylbenzene, bromostyrene, and chlorostyrene, and combinations thereof. Of these, styrene, α-methylstyrene, p-methylstyrene, vinyltoluene, and vinylxylene are preferred, with styrene being more preferred.

Specific examples of the conjugated diene include 1,3-butadiene, 2-methyl-1,3-butadiene, 2,3-dimethyl-1,3-butadiene, 1,3-pentadiene, etc. Preferred among them are 1,3-butadiene and 2-methyl-1,3-butadiene, with 1,3-butadiene being more preferred.

In addition to the conjugated diene, the block copolymer may contain a small proportion of a lower olefinic hydrocarbon, e.g., ethylene, propylene, 1-butene, etc., dicyclopentadiene or a non-conjugated diene.

the content of the repeating unit derived from the alkenyl aromatic compound in the block copolymer of the invention should be more than 45% by weight and up to 80% by weight. It preferably ranges from 47 to 75% by weight, more preferably from 50 to 70% by weight, and most preferably more than 55% by weight and up to 70% by weight. If it exceeds 80% by weight, the resulting resin composition exhibits poor impact strength. If it is up to 45% by weight, the resin composition is unsatisfactory in stiffness and heat resistance, failing to achieve the purpose of the present invention.

The alkenyl aromatic compound/conjugated diene block copolymer is preferably hydrogenated to such a degree that up to 50%, more preferably up to 20%, and most preferably up to 10%, of the unsaturated bonds in the aliphatic chain moiety derived from the conjugated diene should remain non-hydrogenated. The aromatic unsaturated bonds derived from the alkenyl aromatic compound may be hydrogenated to a degree of up to about 25%.

The hydrogenated block copolymer as the component (c) preferably has a number average molecular weight of from 5,000 to 500,000 g/mol, more preferably from 10,000 to 300,000 g/mol, most preferably from 30,000 to 200,000 g/mol, and particularly preferably from 45,000 to 150,000 g/mol, as determined by gel permeation chromatography (GPC) (polystyrene conversion). Those copolymers having a number average molecular weight out of the above-described broadest range are apt to entail cost for production.

In the present invention, the molecular weight and molecular weight distribution curve were determined by GPC. The molecular size was detected by means of a differential refractometer. In determining a relationship between elution time and molecular weight, a monodispersion of polystyrene was used as a standard substance, and each average molecular weight was calculated by polystyrene conversion.

The molecular weight distribution of the hydrogenated block copolymer (c) as measured by GPC is not particularly limited. The copolymer may have any Q value, i.e., a quotient obtained by dividing a weight average molecular weight by a number average molecular weight. Further, the molecular weight distribution curve may have either one peak or plural peaks, and may also have toes in addition to the main peak(s) due to smaller amounts of components having higher or lower molecular weights than the main peak(s).

In the hydrogenated block copolymer (c), the molecular weight of the alkenyl aromatic segment (block (A)) and that of the hydrogenated conjugated diene segment (block (B)) are not particularly limited, and any molecular weights or any combinations may be applicable as long as the number average molecular weight falls within the above-described range.

Some of these hydrogenated block copolymers have a hydrogenated conjugated diene polymer chain to which crystallinity is ascribed presumably for the reason that the hydrogenated conjugated diene polymer chain has a molecular structure similar to a polyolefin. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, e.g., 10° C./min. in an inert gas atmosphere, e.g., nitrogen, by means of these measuring equipments. For example, a sample is one heated to a temperature above an estimated melting point, decreasing the temperature at a rate of 10° C./min., allowing the sample to stand for about 1 minute, and then heating again at a rate of 10° C./min.

The hydrogenated block copolymer to be used may have any degree of crystallinity. In view of a balance of mechanical strength of the resulting resin composition, those hydrogenated block copolymers having a melting point of from −40° C. to 160° C. or having no definite melting point (i.e., having non-crystallinity), as measured according to the above-described technique, are preferred. More preferably, the hydrogenated block copolymers have a melting point of from −20° C. to 130° C., further more preferably from 0° C. to 110° C., most preferably from 20° C. to 100° C., and particularly preferably from 40° C. to 100° C.

The hydrogenated block copolymer may have any glass transition temperature (Tg) ascribed to the hydrogenated conjugated diene polymer chain. From the standpoint of low-temperature impact strength of the resulting resin composition, it preferably has a Tg of up to 0° C., more preferably up to −20° C. Tg of the copolymer can be measured by the aforesaid DSC method or from the visco-elastic behavior toward temperature change as observed with a mechanical spectrometer, etc.

Many processes have been proposed for the production of alkenyl aromatic compound/conjugated diene block copolymers. Typical processes include, for example, the processes described in Japanese Patent Publication No. 23798/65 and U.S. Pat. Nos. 3,595,942 and 4,090,996, in which block-copolymerization is effected in an inert solvent (e.g., cyclohexane) in the presence of a lithium catalyst or a Ziegler catalyst, etc. As the thus obtained block copolymers, there are available commercial products, such as TR 2400 sold by Japan Synthetic Rubber Co., Ltd.

These block copolymers can be hydrogenated in an inert solvent (e.g., cyclohexane) in the presence of a hydrogenating catalyst as described, e.g., in Japanese Patent Publication Nos. 8704/67, 6636/68, and 20814/71. Accordingly to this process, at least 50%, and preferably at least 80%, of the olefinic double bonds in the block (B) can be hydrogenated, while up to 25% of the aromatic unsaturated bonds in the block (A) may be concomitantly hydrogenated. It is also possible to carry out hydrogenation in an inert solvent by using p-toluenesulfonyl hydrazide, etc. according to the process disclosed in *Journal of Polymer Science Part B Polymer Letters*, Vol. 11, pp. 427 to 434 (1973).

For the purpose of ensuring mechanical properties, the above-described resin composition according to the present invention can further contain (d) a diamine compound represented by formula (D-1), (D-2) or (D-3):

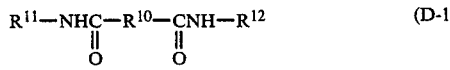

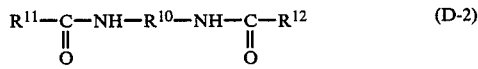

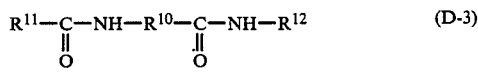

wherein $R^{10}$ represents a straight or branched chain and saturated or unsaturated acyclic hydrocarbon residue having from 1 to 10 carbon atoms, an alicyclic hydrocarbon residue or an aromatic hydrocarbon residue, or the derivative thereof; and $R^{11}$ and $R^{12}$, which may be the same or different, each represents a straight or branched chain and saturated or unsaturated acyclic hydrocarbon residue having from 1 to 10 carbon atoms, an alicyclic hydrocarbon residue or an aromatic hydrocarbon residue, or the derivative thereof.

In formulae (D-1), (D-2), and (D-3), specific examples of $R^{10}$ include a methylene group, an ethylene group, a trimethylene group, a propylene group, a tetramethylene group, an isobutylene group, a penamethylene group, a cyclopentylene group, a hexamethylene group, a cyclohexylene group, an octamethylene group, a decamethylene group, and a phenylene group.

Specific examples of $R^{11}$ or $R^{12}$ include a methyl group, an ethyl group, a propyl group, an isopropyl group, a butyl group, an isobutyl group, a t-butyl group, a pentyl group, an isopentyl group, a cyclopentyl group, a hexyl group, an isohexyl group, a cylohexyl group, a heptyl group, an octyl group, a decyl group, a phenyl group, etc.

$R^{10}$, $R^{11}$, and $R^{12}$ may have one or more substituents selected from, for example, a hydrocarbon group having from 1 to 8 carbon atoms, a halogen atom (e.g., a chlorine atom, a bromine atom, a fluorine atom, etc.), —$OR^{13}$ (wherein $R^{13}$ represents a hydrogen atom or a hydrocarbon a group having from 1 to 8 carbon atoms), —$NR^{14}R^{15}$ (wherein $R^{14}$ and $R^{15}$ each represents a hydrogen atom or a hydrocarbon group having from 1 to 8 carbon atoms), —$OCOR^{16}$ (wherein $R^{16}$ represents a hydrogen atom or a hydrocarbon group having from 1 to 8 carbon atoms), —COOH or the metal salt or anhydride thereof, —$SO_3H$, —$NO_2$, —NO, —CN, and the like.

These diamide compounds are intended to be fused and thereby fluidized in the resin composition upon molding but to be solidified or crystallized at the time of use. Therefore, the diamide compounds to be compounded desirably have a melting point below the molding temperature of the resin composition and above the temperature on use of the molded articles. Since the molding temperature is set to fall within a range of from a temperature at which the system begins to flow (e.g., a melting point or a Tg of the system) up to a temperature at which the system begins to decompose, the melting point of the diamide compounds according to the present invention preferably has a melting point between about 100° C. and about 350° C. When the molding temperature can be shifted out of the above range by addition of a stabilizer or a plasticizer, diamide compounds having melting points out of the above-described range are also employable.

Of these diamide compounds, preferred are those represented by formula (D-1). Specific examples of the compounds of formula (D-1) include adipic acid dianilide, itaconic acid dianilide, etc.

A recommended proportion of the polyolefin (a) in the resin composition according to the present invention ranges from 20 to 80% by weight, preferably from 25 to 67% by weight, more preferably from 25 to 58% by weight, and most preferably from 33 to 55% by weight, per 100% by weight of the total amount of the polyolefin (a), polyphenylene ether resin (b), and partially hydrogenated alkenyl aromatic compound/conjugated diene block copolymer (c). If it is less than 20% by weight, the composition has reduced resistance to organic solvents. If it exceeds 80% by weight, the heat resistance becomes too poor to accomplish the objects of the present invention.

A recommended proportion of the polyphenylene ether resin (b) in the composition ranges from 20 to 80% by weight, preferably from 23 to 65% by weight, more preferably from 30 to 65% by weight, and most preferably from 35 to 53% by weight, per 100% by weight of the total amount of the components (a), (b), and (c). If it is less than 20% by weight, stiffness of the composition is deteriorated, and if it exceeds 80% by weight, organic solvent resistance is insufficient.

A recommended proportion of the hydrogenated alkenyl aromatic compound/conjugated diene block copolymer (c) in the composition ranges from 4 to 50% by weight, preferably from 4 to 30% by weight, more preferably from 7 to 25% by weight, and most preferably from 10 to 20% by weight, per 100% by weight of the total amount of the components (a), (b), and (c). If it is less than 4% by weight, the composition has insufficient impact strength, and if it exceeds 50% by weight, stiffness of the composition becomes unsatisfactory, failing to achieve the objects of the present invention.

The diamide compound (d) which is an optional component of the resin composition can be added in an amount of up to 50 parts by weight, preferably from 0.05 to 30 parts by weight, more preferably from 1 to 20 parts by weight, and most preferably from 2 to 15 parts by weight, per 100 parts by weight of the total amount of the components (a), (b), and (c). The effects produced by addition of the diamide compound become pronounced as the amount to be added increases, but too a large amount exceeding 50 parts by weight would result in not only insufficient mechanical strength but also deterioration of appearance of molded articles due to blooming.

In addition to the above-described components, the resin composition according to the present invention may contain various additives as long as they do not impair the effects of the present invention. Such additives include antioxidants, weathering stabilizers, nucleating agents for polyolefin, slip agents, organic or inorganic fillers or reinforcements, flame retarders, various colorants, antistatics, parting agents, radical generators (e.g., organic peroxides) added in a small amount for controlling molecular weight of polyolefin, and the like. Plasticizers for polyphenylene ether resins, e.g., triphenyl phosphate, may also be used. Further, addition of fillers, such as glass fiber, wollastonite, potassium titanate whiskers, mica, talc, calcium carbonate, etc., is effective to improve a balance of physical properties, such as stiffness, etc., molding properties, dimensional accuracy, dimensional stability, and the like.

The objects of the present invention can be accomplished as long as the resin composition has the above-described compounding ratio, and the phase formed by each component is not particularly limited and requires no particular structure, such as an interpenetrating network structure described in U.S. Pat. No. 693,463 filed 01/22/85, now U.S. Pat. No. 4,612,746, corresponding to Japanese Patent Publication No. 57463/85. It is preferable that the continuous phase by formed by polyolefin for ensuring high solvent resistance or by polyphenylene ether for ensuring high heat resistance.

Compounding for preparing the resin composition of the present invention can be carried out by various methods generally employed for blending resins with resins or compounding agents, such as stabilizers, colorants and fillers. For example, the components in the form of powder or granule are uniformly dispersed in a Henschel mixer, a super mixer, a ribbon blender, a twin-cylinder mixer, etc., and the mixture is then melt-kneaded by means of a kneader, e.g., twin-screw extruder, single-screw extruder, a roll mill, a Banbury mixer, a plastomill, Brabender Plastograph, etc. The melt-kneading is usually performed at a temperature of from 200° to 350° C. The thus obtained resin composition may be extruded into pellets after melt-kneading.

The resin composition of the present invention can be molded easily by molding processes commonly applied to thermoplastic resins, i.e., injection molding, extrusion molding, blow molding, etc. Injection molding is particularly preferred. Taking advantage of the satisfactory mechanical properties, the composition are suited for use as parts, such as automobile parts including exterior parts, e.g., bumpers, door panels, fenders, moles, emblems, wheel covers, engine covers, roofs, spoilers, etc., and interior parts, e.g., instrument panels, console boxes, trims, etc.; exterior parts of appliances, e.g., TV sets, refrigerators, etc.; and so-called office automation equipments; and the like.

The present invention will now be illustrated in greater detail by way of the following Examples and Comparative Examples, but it should be understood that the present invention is not construed to be limited thereto. In these examples, all the parts and percents are given by weight unless otherwise indicated.

EXAMPLES 1 TO 20 AND COMPARATIVE EXAMPLES 1 TO 5

Components (a) to (c) and, in some cases, component (d) shown in Table 3 were thoroughly blended in a super mixer at a compounding ratio shown in Table 3, and the blend ws melt-kneaded in a twin-screw extruder ("PCM" manufactured by Ikegai Iron Works, Ltd.) at 280° C., extruded in strands and cut into pellets. Upon kneading, pentaerythrityl-tetrakis[3-(3,5-di-tert-butyl-4-hydroxyphenyl)propionate] was added to the blend in an amount of 0.3 part per 100 parts of the total amount of the components (a) to (d).

For evaluation of physical properties, specimens were prepared by injection molding in an in-line screw type injection machine ("IS-90B" manufactured by Toshiba Machine Co., Ltd.) at a cylinder temperature of 280° C. and at a mold-cooling temperature of 60° C.

The components (a) to (d) used in sample preparation were as follows.

(a) Polyolefin Resin

A propylene homopolymer (PP), a propylene-ethylene block copolymer (PE) or a propylene-ethylene random copolymer (PER) produced by Mitsubishi Petrochemical Co., Ltd. was used. Results of analyses on PP, PE and PER, e.g., MFR, an ethylene content, etc., are shown in Table 3.

The MFR of the polyolefin was measured in accordance with JIS K7210-1975.

(b) Polyphenylene Ether Resin

Poly(2,6-dimethyl-1,4-phenylene)ether produced by Mitsubishi Petrochemical Co., Ltd. was used. The intrinsic viscosity in chloroform at 30° C., indicative of molecular weight, is shown in Table 3.

(c) Hydrogenated Alkenyl Aromatic Compound-/Conjugated Diene Block Copolymer

Synthesis of Block Copolymer

Styrene was polymerized in an autoclave whose atmosphere had been thoroughly displaced with nitrogen in water-free cyclohexane in the presence on n-butyl lithium containing a small amount of tetrahydrofuran at a temperature of from about 60° to 80° C. A butadiene solution was then added to the polymerization system to effect polymerization of butadiene to form polybutadiene block chains bonded to the polystyrene chains. Thereafter, a styrene solution was added thereto to effect polymerization of styrene to form polystyrene block chains bonded to the polybutadiene chains to obtain a styrene/butadiene block copolymer containing about 60% of styrene block chains.

In the same manner, a styrene/butadiene block copolymer having a styrene content of 70% was prepared. Results of analyses on these block copolymers was well as a commercially available styrene/butadiene block copolymer ("TR 2400" produced by Japan Synthetic Rubber Co., Ltd.; styrene content: about 60% by weight) are shown in Table 1.

TABLE 1

| | Physical Properties of Styrene/Conjugated Diene Block Copolymer | | | |
|---|---|---|---|---|
| Abbr. | Styrene Content (wt %) | Brookfield Viscosity* (cps) | Comonomers | Remark |
| SB-1' | 60 | 650 | styrene/ butadiene | "TR 2400", a trade name produced by Japan Synthetic Rubber Co., Ltd. |

TABLE 1-continued

Physical Properties of Styrene/Conjugated Diene Block Copolymer

| Abbr. | Styrene Content (wt %) | Brookfield Viscosity* (cps) | Comonomers | Remark |
|---|---|---|---|---|
| SB-2' | 60 | 105 | " | prepared by Mitsubishi Petrochemical Co., Ltd. on an experimental base |
| SB-3' | 60 | 720 | " | " |
| SB-4' | 70 | 255 | " | " |

Note: *25° C., 25 wt % toluene solution

Hydrogenation of Block Copolymer

Each of the above-prepared styrene/butadiene block copolymers and a commercially available styrene/butadiene block copolymer ("TR 2400") was thoroughly dried, placed in an autoclave whose atmosphere had been thoroughly displaced with nitrogen, and dissolved in water-free cyclohexane. The solution was subjected to hydrogenation in the presence of a nickel naphthenate catalyst at 60° to 70° C. under a hydrogen pressure of 10 to 13 kg/cm$^2$ for 9 hours. A poor solvent (methanol) was added to the reaction solution, followed by filtration to separate the produced polymer from the solvent. The solid was dried under reduced pressure to obtain a partially hydrogenated copolymer. Results of analyses on these hydrogenated copolymers are shown in Table 2.

For comparison, a commercially available hydrogenated styrene/butadiene triblock copolymer ("Kraton G 1652" produced by Shell Chemical Co., Ltd.; styrene content: 29% by weight) and a commercially available hydrogenated styrene/isoprene diblock copolymer ("Kraton GX 1701" produced by Shell Chemical Co., Ltd.; styrene content: 37% by weight) were used as the component (c) Results of analyses on these block copolymers are also shown in Table 2.

(d) Diamide Compound

N,N'-diphenyl adipic diamide was used.

MFR of the resulting resin composition and various physical properties of molded specimens prepared therefrom were determined in accordance with the following methods. The results obtained are shown in Table 3.

(1) MFR:

Measured in accordance with JIS K7210-1975 with alterations on measuring temperature and load. Measurements were effected at 280° C. under a load of 5 kg.

(2) Flexural Modulus:

Measured in accordance with ISO R178-1974 Procedure 12 (JIS K7203) by the use of an Instron tester. In carrying out measurements at 80° C., a specimen, a sample rack, and a pressurizing wedge were conditioned in a thermostat chamber at 80° C.±1° C. for at least 20 minutes prior to the measurement.

(3) Izod Impact Strength:

Measured in accordance with ISO R180-1969 (JIS K7110) (notched Izod impact strength) by the use of an Izod impact tester manufactured by Toyo Seiki Seisakusho.

(4) Dart Drop Impact Strength:

A sheet of 80 mm long, 120 mm wide, and 2 mm thick prepared by injection molding was fixed on a holder (hole diameter: 50 mm), and a load-sensing dart (2 m×7 kgf) was fallen thereon to determine deforming and breaking behaviors of the specimen to impact load. The striking energy having been absorbed up to the point of crack initiation was calculated from the resulting impact pattern and taken as impact strength.

(5) Heat Distortion Temperature:

Measured in accordance with ISO R75-1958 Method A (JIS K7207-1974 Method A). An injection-molded specimen was subjected to anealing at 100° C. for 30 minutes prior to measurement.

TABLE 2

| Abbr. | Styrene Content (wt %) | Type of Block | Number Average Mol. Wt. (g/mol) | Weight Average Mol. Wt. (g/mol) | M.P. of Hydrogenated Polybutadiene Moiety (°C.) | Remark |
|---|---|---|---|---|---|---|
| SB-1 | 59 | linear | 8.1 × 10$^4$ | 10 × 10$^4$ | 73 | |
| SB-2 | 59 | A-B-A triblock | 6.2 × 10$^4$ | 7.1 × 10$^4$ | 88 | |
| SB-3 | 59 | " | 11.1 × 10$^4$ | 12.8 × 10$^4$ | 93 | |
| SB-4 | 69 | " | 9.5 × 10$^4$ | 10.5 × 10$^4$ | 92 | |
| G 1652 | 29 | " | 7.0 × 10$^4$ | 8.0 × 10$^4$ | 28 | "Kraton G 1652", a trade name produced by Shell Chemical Co., Ltd. |
| GX 1701 | 37 | A-B diblock | 11.8 × 10$^4$ | 13.5 × 10$^4$ | — | "Kraton GX 1701", a trade name produced by Shell Chemical Co., Ltd. |

TABLE 3

| Composition: | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| (a) Polyolefin: | | | | | | | | | | | | | |
| Kind | PP | PE | PE | PE | PE | PE | PE | PE | PE | PE | PE | PE | PE |
| MFR (g/10 min.) | 0.8 | 0.75 | 0.75 | 0.75 | 0.75 | 0.75 | 0.75 | 0.75 | 0.75 | 0.75 | 0.75 | 0.75 | 0.75 |
| Ethylene content (wt %)* | — | 12.5 | 12.5 | 12.5 | 12.5 | 12.5 | 12.5 | 12.5 | 12.5 | 12.5 | 12.5 | 12.5 | 12.5 |
| CXS Content* (wt %) | 2.7 | 16.5 | 16.5 | 16.5 | 16.5 | 16.5 | 16.5 | 16.5 | 16.5 | 16.5 | 16.5 | 16.5 | 16.5 |
| Ethylene Content/CXS Content Ratio | — | 0.76 | 0.76 | 0.76 | 0.76 | 0.76 | 0.76 | 0.76 | 0.76 | 0.76 | 0.76 | 0.76 | 0.76 |
| Ethylene Content in CXS (wt %) | — | 49 | 49 | 49 | 49 | 49 | 49 | 49 | 49 | 49 | 49 | 49 | 49 |
| Intrinsic Viscosity of CXS (dl/g) | 0.78 | 3.1 | 3.1 | 3.1 | 3.1 | 3.1 | 3.1 | 3.1 | 3.1 | 3.1 | 3.1 | 3.1 | 3.1 |
| Amount Added (wt %) | 43.5 | 43.5 | 43.5 | 43.5 | 43.5 | 43.5 | 43.5 | 43.5 | 43.5 | 43.5 | 43.5 | 43.5 | 43.5 |
| (b) Polyphenylene Ether: | | | | | | | | | | | | | |
| Intrinsic Viscosity (dl/g) | 0.52 | 0.52 | 0.4 | 0.28 | 0.4 | 0.52 | 0.52 | 0.52 | 0.52 | 0.52 | 0.4 | 0.52 | 0.4 |
| Amount Added (wt %) | 43.5 | 43.5 | 43.5 | 43.5 | 43.5 | 43.5 | 43.5 | 43.5 | 43.5 | 43.5 | 43.5 | 43.5 | 43.5 |
| (c) Hydrogenated Block Copolymer: | | | | | | | | | | | | | |
| Kind | SB-1 | SB-1 | SB-1 | SB-1 | SB-1 | SB-1 | SB-1 | SB-1 | SB-2 | SB-3 | SB-2 | SB-4 | SB-4 |
| Styrene Repeating unit Content (wt %) | 59 | 59 | 59 | 59 | 59 | 59 | 59 | 59 | 59 | 59 | 59 | 69 | 69 |
| Number Average Mol. Wt. (×10⁴ g/mol) | 8.1 | 8.1 | 8.1 | 8.1 | 8.1 | 8.1 | 8.1 | 8.1 | 6.2 | 11.1 | 6.2 | 9.5 | 9.5 |
| Weight Average Mol. Wt. (×10⁴ g/mol) | 10 | 10 | 10 | 10 | 10 | 10 | 10 | 10 | 7.1 | 12.8 | 7.1 | 10.5 | 10.5 |
| Amount Added (wt %) | 13 | 13 | 13 | 13 | 13 | 13 | 13 | 13 | 13 | 13 | 13 | 13 | 13 |
| (d) Diamide Compound: | | | | | | | | | | | | | |
| Amount Added (part by wt.)** | — | — | — | — | 5 | 3 | 5 | 10 | — | — | 5 | — | 5 |
| Physical Properties: | | | | | | | | | | | | | |
| MFR (280° C., 5 kg) (g/10 min.) | 4.3 | 4.3 | 7.9 | 26 | 16.4 | 6 | 9 | 8.8 | 7.2 | 4.1 | 21 | 9.8 | 17.3 |
| Flexural Modulus (kg/cm²) at 23° C. | 17900 | 12000 | 12500 | 13600 | 14000 | 12900 | 12900 | 14100 | 13000 | 12700 | 14700 | 13400 | 15000 |

TABLE 3-continued

| | Example 14 | Example 15 | Example 16 | Example 17 | Example 18 | Example 19 | Example 20 | Comp. Example 1 | Comp. Example 2 | Comp. Example 3 | Comp. Example 4 | Comp. Example 5 |
|---|---|---|---|---|---|---|---|---|---|---|---|---|
| at 80° C. | 9300 | 5700 | 6200 | 8000 | 7300 | 6000 | 6200 | 7500 | 5000 | 5300 | 6600 | 6600 | 8900 |
| Heat Distortion Temperature (°C.) | | | | | | | | | | | | |
| under 18.6 kg/cm² | 103 | 81 | 91 | 116 | 102 | 90 | 106 | 79 | 92 | 101 | 100 | 110 |
| under 4.6 kg/cm² | 135 | 120 | 130 | 152 | 133 | 125 | 136 | 117 | 127 | 135 | 132 | 139 |
| Izod Impact Strength (kg · cm/cm) | | | | | | | | | | | | |
| at 23° C. | 7.5 | 11.8 | 17.4 | 36.8 | 41.9 | 18.1 | 23.4 | 15.7 | 8.7 | no breaking (52) | 10.2 | 30 |
| at −30° C. | 4.9 | 7.2 | 8.5 | 10.2 | 10.2 | 8.3 | 7.6 | 8.5 | 5.7 | 14 | 6.3 | 7.2 |
| Dart Drop Impact Strength (2 mm⁻ᵗ)(kg · cm) | | | | | | | | | | | | |
| at 23° C. | 25 | 85 | 112 | 138 | 140 | 143 | 95 | 112 | 75 | 164 | 84 | 102 |
| at −30° C. | 11 | 29 | 47 | 60 | 100 | 32 | 36 | 48 | 27 | 144 | 28 | 33 |
| Composition: | | | | | | | | | | | | |
| (a) Polyolefin: | | | | | | | | | | | | |
| Kind | PE | PE | PE | PE | PE | PE | PER | PP | PP | PE | PP | PP |
| MFR (g/10 min.) | 2.5 | 9 | 1.6 | 0.9 | 0.7 | 2.5 | 0.65 | 0.8 | 0.8 | 0.75 | 0.8 | 10 |
| Ethylene content (wt %) | 11.9 | 6.6 | 13.3 | 13.6 | 17.6 | 11.9 | 4.1 | — | — | 12.5 | — | — |
| CXS Content* (wt %) | 18.5 | 15.8 | 15.3 | 10 | 4.8 | 18.5 | 9.8 | 2.7 | 2.7 | 16.5 | — | — |
| Ethylene Content/CXS Content Ratio | 0.65 | 0.41 | 0.87 | 1.36 | 3.66 | 0.65 | 0.43 | — | — | 0.76 | — | — |
| Ethylene Content in CXS (wt %) | 54 | 36 | 48 | 47 | 45 | 54 | — | — | — | 49 | — | — |
| Intrinsic Viscosity of CXS (dl/g) | 3.7 | 3 | 1.7 | 3.3 | 3.8 | 3.7 | — | 0.78 | 0.78 | 3.1 | — | — |
| Amount Added (wt %) | 43.5 | 43.5 | 43.5 | 43.5 | 43.5 | 43.5 | 43.5 | 50 | 43.5 | 43.5 | 43.5 | 43.5 |
| (b) Polyphenylene Ether: | | | | | | | | | | | | |
| Intrinsic Viscosity (dl/g) | 0.52 | 0.52 | 0.52 | 0.52 | 0.52 | 0.4 | 0.4 | 0.52 | 0.52 | 0.52 | 0.52 | 0.52 |
| Amount Added (wt %) | 43.5 | 43.5 | 43.5 | 43.5 | 43.5 | 43.5 | 43.5 | 50 | 43.5 | 43.5 | 43.5 | 43.5 |
| (c) Hydrogenated Block Copolymer: | | | | | | | | | | | | |
| Kind | SB-1 | SB-1 | SB-1 | SB-1 | SB-1 | SB-1 | SB-1 | — | G 1652 | G 1652 | GX 1701 | GX 1701 |
| Styrene Repeating Unit Content (wt %) | 59 | 59 | 59 | 59 | 59 | 59 | 59 | — | 29 | 29 | 37 | 37 |
| Number Average Mol. Wt. (×10⁴ g/mol) | 8.1 | 8.1 | 8.1 | 8.1 | 8.1 | 8.1 | 8.1 | — | 7.0 | 7.0 | 11.8 | 11.8 |

TABLE 3-continued

| | | | | | | | | | | | |
|---|---|---|---|---|---|---|---|---|---|---|---|
| Weight Average Mol. Wt. (×10⁴ g/mol) | 10 | 10 | 10 | 10 | 10 | 10 | 10 | — | 8.0 | 8.0 | 12.8 | 12.8 |
| Amount Added (wt %) | 13 | 13 | 13 | 13 | 13 | 13 | 13 | 0 | 13 | 13 | 13 | 13 |
| (d) Diamide Compound: | | | | | | | | | | | | |
| Amount Added (part by wt.)** | — | — | — | — | — | 5 | 5 | — | — | — | — | — |
| Physical Properties: | | | | | | | | | | | | |
| MFR (280° C., 5 kg) (g/10 min.) | 7.6 | 13.1 | 5.8 | 4.8 | 10 | 21.7 | 8.5 | 5.6 | 8.6 | 10 | 4.3 | 15.7 |
| Flexural Modulus (kg/cm²) | | | | | | | | | | | | |
| at 23° C. | 12500 | 11600 | 12600 | 14800 | 14300 | 14000 | 14500 | 18100 | 8600 | 5600 | 8100 | 5700 |
| at 80° C. | 6000 | 4900 | 5900 | 7400 | 7400 | 8300 | 7600 | 8900 | 3600 | 2600 | 3000 | 1400 |
| Heat Distortion Temperature (°C.) | | | | | | | | | | | | |
| under 18.6 kg/cm² | 76 | 65 | 80 | 99 | 96 | 105 | 108 | 108 | 63 | 58 | 60 | 58 |
| under 4.6 kg/cm² | 115 | 108 | 120 | 132 | 132 | 130 | 137 | 139 | 109 | 103 | 106 | 96 |
| Izod Impact Strength (kg · cm/cm) | | | | | | | | | | | | |
| at 23° C. | 7.9 | 7.5 | 6.9 | 6.5 | 6.6 | 23.5 | 43.7 | 2.6 | 17.3 | 12.2 | 13.2 | 7.5 |
| at −30° C. | 6.7 | 5.2 | 4.8 | 4.8 | 4.9 | 8.1 | 5.8 | 3.1 | 8.3 | 9.8 | 8.0 | 4.2 |
| Dart Drop Impact Strength (2 mm⁻ᵗ)(kg · cm) | | | | | | | | | | | | |
| at 23° C. | 97 | 101 | 42 | 64 | 48 | 146 | 150 | 9 | 87 | 126 | 125 | 78 |
| at −30° C. | 30 | 76 | 29 | 12 | 12 | 115 | 20 | 6 | 17 | 30 | 38 | 29 |

Note:
*Per 100% by weight of the total amount of (a).
**Per 100 parts by weight of the total amount of (a), (b) and (c).

While the invention has been described in detail and with reference to specific embodiments thereof, it will be apparent to one skilled in the art that various changes and modifications can be made therein without departing from the spirit and scope thereof.

What is claimed is:

1. A polyphenylene ether composition, comprising: (a) from 33 to 67% by weight of a polyolefin resin, (b) from 23 to 65% by weight of a polyphenylene ether resin and (c) from 4 to 30% by weight of a hydrogenated block copolymer of an alkenyl aromatic compound and a conjugated diene which contains from 50 to 80% by weight of a repeating unit derived from the alkenyl aromatic compound.

2. A polyphenylene ether composition as claimed in claim 1, wherein the polyphenylene ether resin is present in an amount of from 30 to 65% by weight, and the hydrogenated block copolymer is present in an amount of from 7 to 25% by weight.

3. A polyphenylene ether composition as claimed in claim 1, wherein the hydrogenated block copolymer contains from 50% to 70% by weight of a repeating unit derived from the alkenyl aromatic compound.

4. A polyphenylene ether composition as claimed in claim 1, wherein said hydrogenated block copolymer contains unsaturated bonds derived from the conjugated diene which remain non-hydrogenated in an amount of up to 50% based on the total conjugated diene-derived unsaturated bonds before hydrogenation.

5. A polyphenylene ether composition as claimed in claim 1, wherein said hydrogenated block copolymer contains unsaturated bonds derived from the conjugated diene which remain non-hydrogenated in an amount of up to 20% based on the total conjugated diene-derived unsaturated bonds before hydrogenation.

6. A polyphenylene ether composition as claimed in claim 1, wherein said hydrogenated block copolymer has a molecular weight of from 5,000 to 500,000 g/mol as determined by gel-permeation chromatography used polystyrene as a standard substance.

7. A polyphenylene ether composition as claimed in claim 1, wherein said polyolefin resin is a copolymer of two or more monomers selected from α-olefins.

8. A polyphenylene ether composition as claimed in claim 1, wherein said polyolefin resin contains a combination of a homo- or copolymer of one more of α-olefins and a copolymer of a different kind of an α-olefin or a different copolymerization ratio.

9. A polyphenylene ether composition as claimed in claim 1, wherein said polyolefin resin contains isotactic polypropylene.

10. A polyphenylene ether composition as claimed in claim 9, wherein said polyolefin resin contains isotactic polypropylene and a copolymer of two or more monomers selected from α-olefins.

11. A polyphenylene ether composition as claimed in claim 9, wherein said polyolefin resin contains a propylene homopolymer or a copolymer or propylene and other α-olefins and an α-olefin polymer having rubbery properties at ambient temperature.

12. A polyphenylene ether composition as claimed in claim 9, wherein said polyolefin resin is a polypropylene resin containing from 3 to 40% by weight of a cold xylene soluble matter.

13. A polyphenylene ether composition as claimed in claim 9, wherein said polyolefin resin is a polypropylene resin containing from 8 to 30% by weight of a cold xylene soluble matter.

14. A polyphenylene ether composition, comprising: (a) from 33 to 67% by weight of an ethylene-propylene block copolymer, (b) from 23 to 65% by weight of a polyphenylene ether resin, and (c) from 4 to 30% by weight of a hydrogenated block copolymer of an alkenyl aromatic compound and a conjugated diene which contains from 50 to 80% by weight of a repeating unit derived from the alkenyl aromatic compound.

* * * * *

UNITED STATES PATENT AND TRADEMARK OFFICE
CERTIFICATE OF CORRECTION

PATENT NO. : 4,863,997
DATED : Sept. 05, 1989
INVENTOR(S) : Nobuhiro Shibuya, et al It is certified that error appears in the above-identified patent and that said Letters Patent is hereby corrected as shown below:

On the title page:

The Assignee is incorrectly recorded, "Mitsubishi Petrochemical Co., Ltd., Tokyo; Toyota Jidosha Kabushiki Kiasha, Toyota, both of Japan" should be:

--Mitsubishi Petrochemical Co., Ltd., Tokyo; Toyota Jidosha Kabushiki Kaisha, Toyota, both of Japan--

Signed and Sealed this

Ninth Day of October, 1990

Attest:

HARRY F. MANBECK, JR.

Attesting Officer

Commissioner of Patents and Trademarks